US009141633B1

(12) United States Patent
Li et al.

(10) Patent No.: US 9,141,633 B1
(45) Date of Patent: Sep. 22, 2015

(54) SPECIAL MARKERS TO OPTIMIZE ACCESS CONTROL LIST (ACL) DATA FOR DEDUPLICATION

(75) Inventors: Junxu Li, Pleasanton, CA (US); Scott Clifford Auchmoody, Irvine, CA (US); Jennifer Starling, Lake Forest, CA (US); Yuping Li, Anaheim, CA (US)

(73) Assignee: EMC Corporation, Hopkinton, MA (US)

( * ) Notice: Subject to any disclaimer, the term of this patent is extended or adjusted under 35 U.S.C. 154(b) by 237 days.

(21) Appl. No.: 13/534,906

(22) Filed: Jun. 27, 2012

(51) Int. Cl.
*G06F 17/30* (2006.01)

(52) U.S. Cl.
CPC .... *G06F 17/30159* (2013.01); *G06F 17/30073* (2013.01); *G06F 17/30342* (2013.01)

(58) Field of Classification Search
None
See application file for complete search history.

(56) References Cited

U.S. PATENT DOCUMENTS

| 6,189,036 | B1* | 2/2001 | Kao | 709/229 |
| 6,480,851 | B1* | 11/2002 | Terek | 726/28 |
| 7,613,701 | B2* | 11/2009 | Zhao et al. | 1/1 |
| 8,315,985 | B1* | 11/2012 | Ohr et al. | 707/664 |
| 8,352,540 | B2* | 1/2013 | Anglin et al. | 709/201 |
| 2006/0294051 | A1* | 12/2006 | Kapadia et al. | 707/1 |
| 2009/0265399 | A1* | 10/2009 | Cannon et al. | 707/205 |
| 2010/0250501 | A1* | 9/2010 | Mandagere et al. | 707/692 |
| 2012/0059800 | A1* | 3/2012 | Guo | 707/664 |
| 2012/0084269 | A1* | 4/2012 | Vijayan et al. | 707/692 |
| 2012/0166401 | A1* | 6/2012 | Li et al. | 707/692 |
| 2012/0310890 | A1* | 12/2012 | Dodd et al. | 707/646 |
| 2013/0086006 | A1* | 4/2013 | Colgrove et al. | 707/692 |
| 2013/0159648 | A1* | 6/2013 | Anglin et al. | 711/162 |
| 2013/0246470 | A1* | 9/2013 | Price et al. | 707/783 |

* cited by examiner

*Primary Examiner* — Michelle Owyang
(74) *Attorney, Agent, or Firm* — Blakely, Sokoloff, Taylor & Zafman LLP

(57) ABSTRACT

Techniques for deduplicating a backup stream with ACL data embedded therein are described. According to one embodiment, a storage system receives a backup stream from a client, where the backup stream includes multiple data streams to be stored in the storage system. Each data stream represents a file or a directory of one or more files of a file system associated with the client. The storage system is to scan the backup stream to recognize an access control list (ACL) marker associated with at least one of the data streams, where the ACL marker identifies ACL data representing an ACL of the at least one data stream. The storage system is to chunk using a predetermined chunking algorithm the ACL data into a plurality of ACL data chunks to be stored in the storage system in a deduplicated manner.

21 Claims, 7 Drawing Sheets

```
struct dd_marker_hdr_t
{
    uint32_t pattern;    /* pattern to recognize */    301
    uint32_t type;       /* type of the marker */      302
    uint32_t len;        /* length of data following the header */    303
};
```

FIG. 3

SPECIAL MARKERS TO OPTIMIZE ACCESS CONTROL LIST (ACL) DATA FOR DEDUPLICATION

FIELD OF THE INVENTION

Embodiments of the present invention relate generally to data storage systems. More particularly, embodiments of the invention relate to using special markers to optimize access control list (ACL) data for better deduplication.

BACKGROUND

Data storage utilization is continually increasing, causing the proliferation of storage systems in data centers. In order to reduce storage space of a storage system, deduplication techniques are utilized, where data objects or files are segmented in chunks and only the deduplicated chunks are stored in the storage system.

A typical file system includes an access control system that maintains an access control list (ACL) for a file or a directory of files, where the ACL list specifies the permissions of a file or a directory of files. When a file or a directory of files of a file system is backed up, the ACL data associated with the files may also be backed up so that the proper ACL can be re-enforced when the files are restored from the storage system. Typically, a majority of the ACL data of a file system is repetitive and the ACL data is blended with data files, which may reduce the deduplication rate when during deduplication of the data files.

BRIEF DESCRIPTION OF THE DRAWINGS

Embodiments of the invention are illustrated by way of example and not limitation in the figures of the accompanying drawings in which like references indicate similar elements.

FIG. 3 is a block diagram illustrating a data structure representing an ACL header according to one embodiment of the invention.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Techniques for deduplicating a backup stream with ACL data embedded therein are described. According to some embodiments, special markers (also referred to herein as ACL markers) are utilized to mark the location and/or boundaries of ACL data of a backup stream of a file system. When the backup stream is received at a storage system, such as a deduplicated backup storage system, the ACL markers are recognized and the corresponding ACL data (e.g., ACL data regions or boundaries) is identified. The ACL data may then be deduplicated, particularly when a size of the ACL data is relatively large. Since in general ACL data across a file system for a particular user or users may very much be the same or similar, a deduplication rate of the ACL data can be significantly improved.

Figure 1:
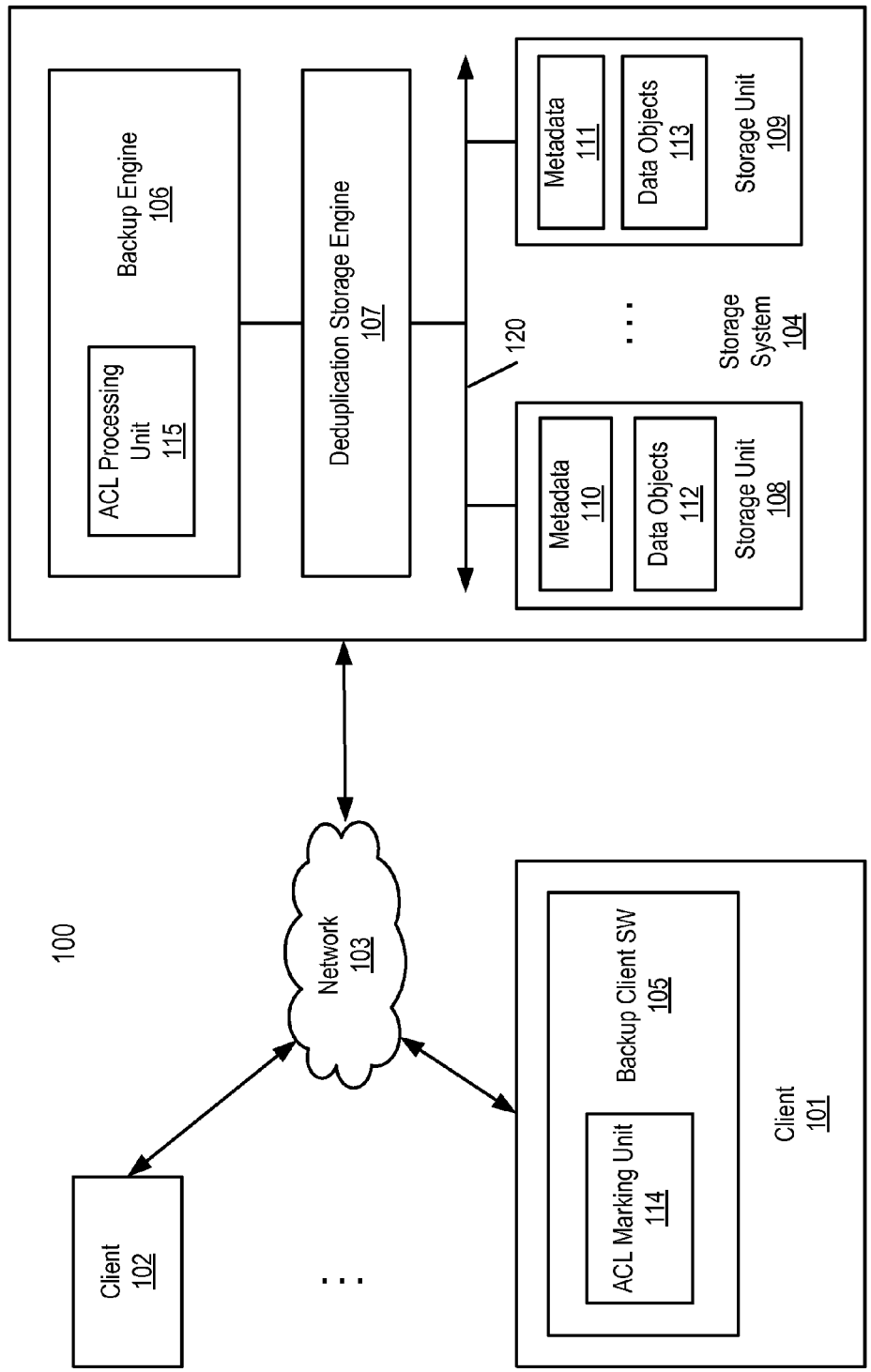
FIG. 1 is a block diagram illustrating a storage system according to one embodiment of the invention.

FIG. 1 is a block diagram illustrating a storage system according to one embodiment of the invention. Referring to FIG. 1, system 100 includes, but is not limited to, one or more client systems 101-102 communicatively coupled to storage system 104 over network 103. Clients 101-102 may be any type of clients such as a server, a personal computer (e.g., desktops, laptops, and tablets), a "thin" client, a personal digital assistant (PDA), a Web enabled appliance, a gaming device, a media player, or a mobile phone (e.g., Smartphone), etc. Network 103 may be any type of networks such as a local area network (LAN), a wide area network (WAN) such as the Internet, or a combination thereof.

Storage system 104 may represent any type of server or cluster of servers. For example, storage system 104 may be a storage server used for any of various different purposes, such as to provide users with access to shared data and/or to back up data such as mission critical data. In one embodiment, storage system 104 includes, but is not limited to, backup engine 106, deduplication storage engine 107, and one or more storage units 108-109 communicatively coupled to each other. Storage units 108-109 may be implemented locally (e.g., single node operating environment) or remotely (e.g., multi-node operating environment) via interconnect 120, which may be a bus and/or a network. Backup engine 106 is configured to back up data of clients 101-102 and to store the backup files in storage units 108-109.

In response to a data file, for example, received from backup engine 106, to be stored in storage units 108-109, according to one embodiment, deduplication storage engine 107 is configured to segment the data file into multiple chunks (also referred to as segments) according to a variety of segmentation policies or rules. Deduplication storage engine 107 may choose not to store a chunk in a storage unit if the chunk has been previously stored in storage units 108-109. In the event that deduplication storage engine 107 chooses not to store the chunk in storage units 108-109, it stores metadata associated with the chunk to enable the reconstruction of the file using the previously stored chunk. As a result, chunks of data files are stored in a deduplicated manner, either within each of storage units 108-109 or across at least some of storage units 108-109. The metadata, such as metadata 110-111, may be stored in at least some of storage units 108-109, such that files can be accessed independent of another storage unit. Metadata of each storage unit includes enough information to provide access to the files it contains.

According to one embodiment, backup engine 106 includes an ACL processing unit 115 to process ACL data of a backup stream received from clients 101-102. In one embodiment, ACL processing unit 115 is to recognize ACL markers marking the corresponding ACL data within the backup stream. Once the ACL markers have been recognized, the associated ACL data is identified based on the ACL markers. For example, the size or a boundary of an ACL data region may be determined based on the ACL markers. The ACL data may be deduplicated by deduplication storage engine 107 into deduplicated ACL data chunks and the deduplicated ACL data chunks are then stored in any of storage units 108-109 as part of data objects 112-113. In one embodiment, ACL markers may be inserted into the backup stream at the client prior to transmitting the backup stream to storage system 104.

For example, a backup stream may be generated by a backup client software 105 of client 101 in response to a request for backing up data stored in client 101. The backup stream may include one or more data streams, each data stream representing a file or a directory of one or more files or subdirectories, dependent upon the specific backup policy or schedule. In addition, backup client software 105 includes an ACL marking unit 114 to scan the data streams to identify ACL data and to mark the ACL data using a predetermined ACL marker. In one embodiment, ACL marking unit 114 is to insert an ACL marker (also referred to as an ACL header) in front of an ACL data block and optionally after the ACL data block to identify the boundary of the data block. According to one embodiment, an ACL marker includes a predetermined signature and a length identifying a size of the ACL data following the ACL marker. Note that although not shown, the architecture of clients 101-102 may be identical or similar. Client 102 may also include backup client software and its corresponding ACL marking unit running therein.

When the backup stream is received by backup engine 106 from backup client software 105, ACL processing unit 115 of backup engine 106 is to scan the backup stream to recognize the ACL markers inserted by ACL marking unit 114 to identify the corresponding ACL data. The ACL data may be deduplicated into deduplicated ACL data chunks and the deduplicated ACL data chunks are then stored in storage units 108-109. In one embodiment, the ACL data may be deduplicated when the ACL data satisfies a predetermined condition. For example, according to a particular embodiment, the ACL data may be deduplicated if the size of the ACL data exceeds a predetermined threshold (e.g., minimum chunk size associated with the storage system 104).

ACL data refers to permission attributes associated with a file or directory of one or more files. Most of operating systems, such as Windows, network file system (NFS), or UNIX, store ACL data along with the content data. When a backup stream is generated, the ACL data may also be embedded within the backup stream along with the associated files or directories. ACLs are attributes of a file or directory that control which users on a file system can access the file or directory. Different types of access are defined, typically read, write and execute. A single access control entry specifies either allow or deny, the type of access and then the user or group the access refers to. Typically, an ACL contains all deny access entries followed by all allow access entries, or vice versa. The ACL entries are evaluated by the operating system to determine if a user has requested access to a file. ACLs can be from several hundred bytes to hundreds of kilobytes. When stored in the file system, ACL can include entries that state Access Control Items can be inherited from the directory above it. When a file and its attributes are written out for backup, all inherited items must be written out so that files may be restored individually. Very often because of inherited ACL, there is a large amount of data duplication in ACLs in backup streams.

Note that ACL processing unit 115 may be implemented as a standalone processing unit communicatively coupled to backup engine 106 and/or deduplication storage engine 107. In this example, storage system 104 operates as a backup server. In another configuration, storage system 104 may operate as a non-backup system, such as, for example, a regular file server. When storage system 104 operates as a regular storage system, ACL processing unit 115 can be coupled to an interface, such as a file system interface, a Web interface, an application programming interface (API), etc., to receive a file or files from clients 101-102 to be stored in storage units 108-109. Furthermore, ACL marking unit 114 may also be implemented within storage system 104. In such a configuration, ACL marking unit 114, operating at the server side, is to mark the ACL data of a file stream using the techniques described above and ACL processing unit 115 is to recognize and process the ACL markers accordingly as described. ACL marking unit 114 and ACL processing unit 115 may also be implemented as a single unit deployed within storage system 104. Other configurations may also exist.

Figure 2A:
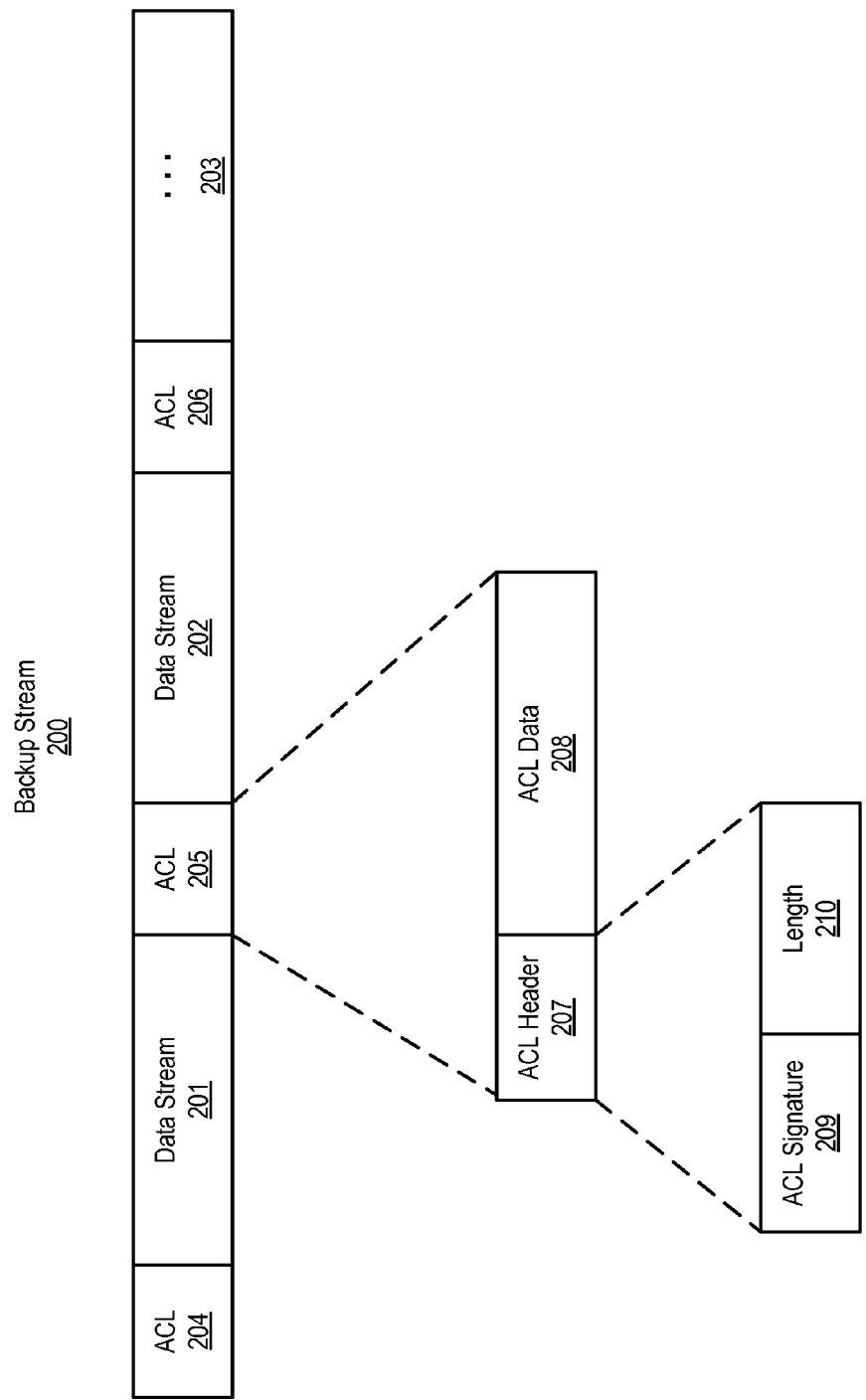
FIGS. 2A and 2B are block diagrams illustrating a backup stream according to certain embodiments of the invention.
Figure 2B:
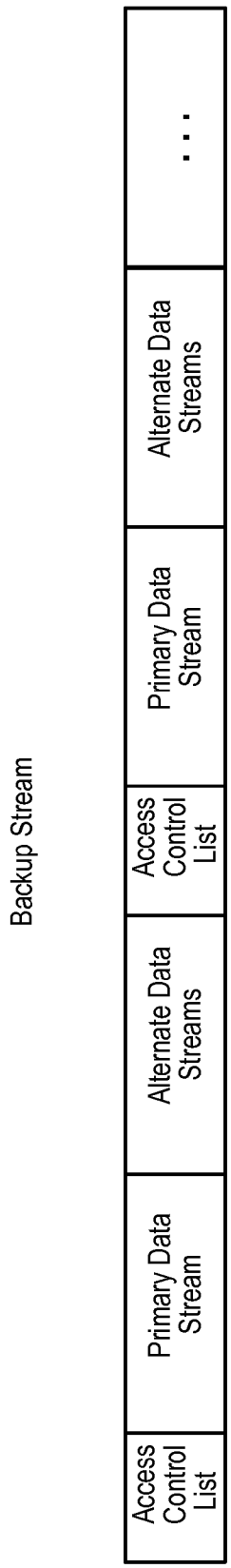

FIG. 2A is a block diagram illustrating an example of a backup stream according to one embodiment of the invention. For example, backup stream 200 may be generated by backup client software 105 and processed by backup engine 106 of FIG. 1. Referring to FIG. 2A, backup stream 200 includes data streams 201-203, each data stream being associated with ACL blocks 204-206. Note that locations and format of ACL blocks 204-206 may vary dependent upon the specific file systems or operating systems they are associated with. A data stream may further include a primary data stream and one or more alternate data streams, as shown in FIG. 2B. Alternate data streams can contain any ancillary data or metadata for a file object. For example, a JPEG image may contain information regarding how the originally photograph was taken, such as GPS coordinates, F stop, shuttle speed, camera model etc. Alternate data streams are used by a file system to provide extra data and metadata with the ability to name each stream. In this way, the file system is extensible beyond the original design of the file system. This functionality is available on a variety of operating systems, such as, for example, Windows with the NTFS file system from Microsoft. In the case of NTFS, one of the alternate data streams, the "security stream" contains the access control lists for a file. In this situation, a primary data stream is considered as default file data, while the operating system allows alternate date streams that can store additional named file data.

According to one embodiment, an ACL block, in this example ACL block 205, includes an ACL marker in a form of ACL header 207 and ACL data 208. ACL marker 207 may be inserted by an ACL marking unit such as ACL marking unit 114. For example, the ACL marking unit scans backup stream 200 to identify ACL data of ACL blocks 204-206. In this example, once ACL data 208 has been identified, ACL marker 207 is inserted, for example, in front of ACL data 208.

According to one embodiment, an ACL marker, in this example ACL header 207, includes an ACL signature 209 and a length 210. ACL signature 209 includes a predetermined pattern that can be used to identify ACL data 208. Length 210 specifies the size of ACL data 208. As a result, when the ACL processing unit scans backup stream 200, it can recognize ACL header 207 based on its ACL signature 209 and determine the size of ACL data 208 based on length 210. ACL data 208 can then be anchored and separated from header 207, and deduplicated as needed. ACL header 207 can be implemented in a variety of data structures.

FIG. 3 is a block diagram illustrating an example of an ACL header according to one embodiment. Referring to FIG. 3, ACL header 300 may represent any of the ACL headers as shown in FIGS. 2A-2B. According to one embodiment, header 300 includes a pattern field 301, a type of marker field 302, and a length field 303. Pattern field 301 is used by processing logic to recognize that this is a marker the processing logic is responsible for processing. Type field 302 is used to identify the type of the marker, such as, for example, an ACL marker and it can be used to identify other types of markers. Length field 303 is used to specify the size of the ACL data that follows header 300. Note that pattern field 301 and type field 302 may be a single field to identify an ACL marker. In one embodiment, type field 302 stores a large integer to represent an ACL marker. In one particular embodiment, the large integer may be a square of a large prime number, such as 0x527A9661 which is a square of prime number 37199. Other integer numbers may also be utilized.

Figure 4:
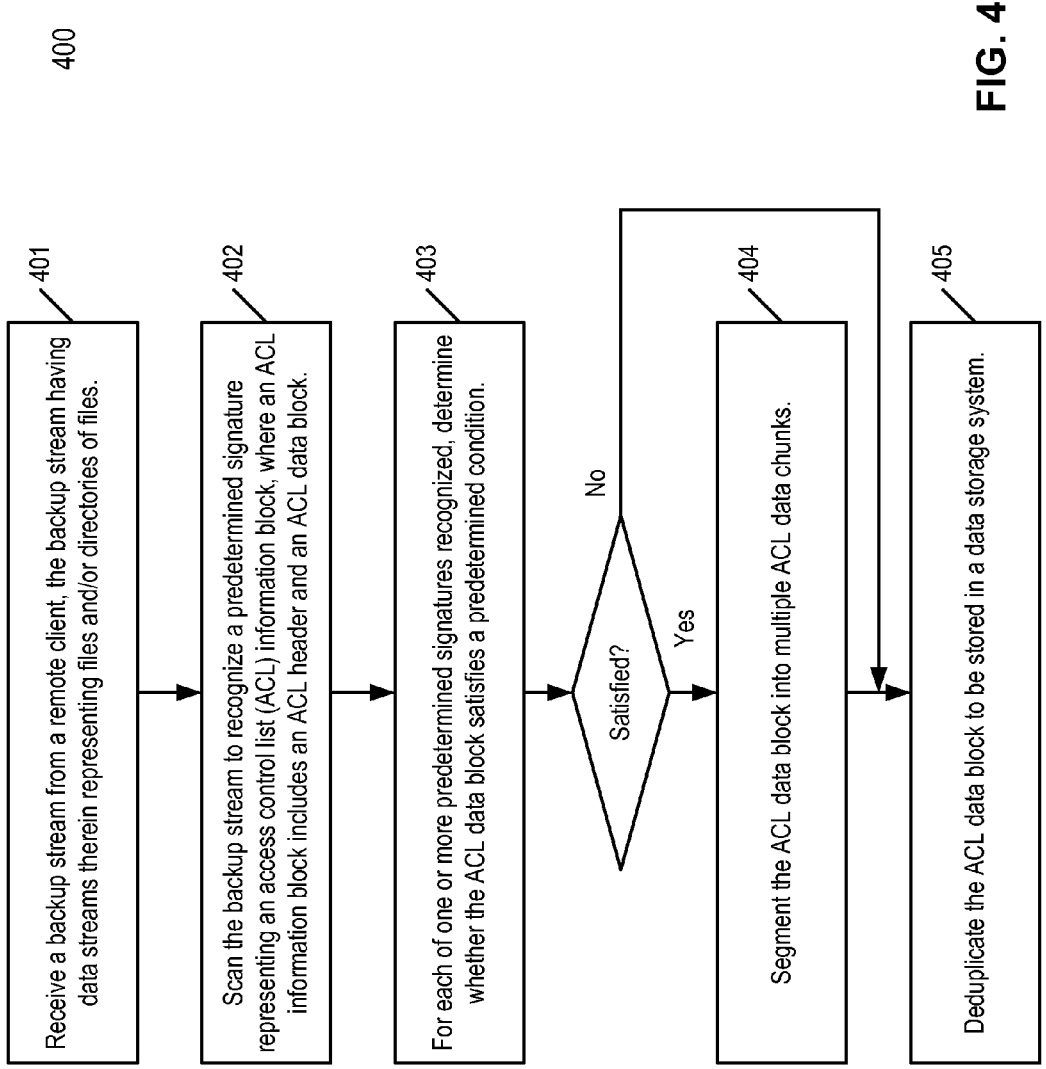
FIG. 4 is a flow diagram illustrating a method for processing ACL markers in a backup stream according to one embodiment of the invention.

FIG. 4 is a flow diagram illustrating a method for processing ACL markers in a backup stream according to one embodiment of the invention. Method 400 may be performed by processing logic that may include software, hardware, or a combination thereof. For example, method 400 may be performed by ACL processing unit 115 of FIG. 1. Referring to FIG. 4, at block 401, a backup stream is received at a storage system from a remote client, where the backup stream includes one or more data streams therein representing files and/or directories of files. At block 402, processing logic scans the backup stream to recognize a predetermined signature (e.g., ACL header) representing an ACL data block. At block 403, for each of the one or more predetermined signatures recognized, processing logic identifies the associated ACL data block and determines whether the ACL data block satisfies a predetermined condition (e.g., whether the size of the ACL data block is greater than a predetermined threshold, such as the minimum chunk size associated with a deduplicated storage system). If so, at block 404, the ACL data block is segmented into multiple ACL data chunks. At block 405, the ACL data chunks are deduplicated for storage.

Figure 5:
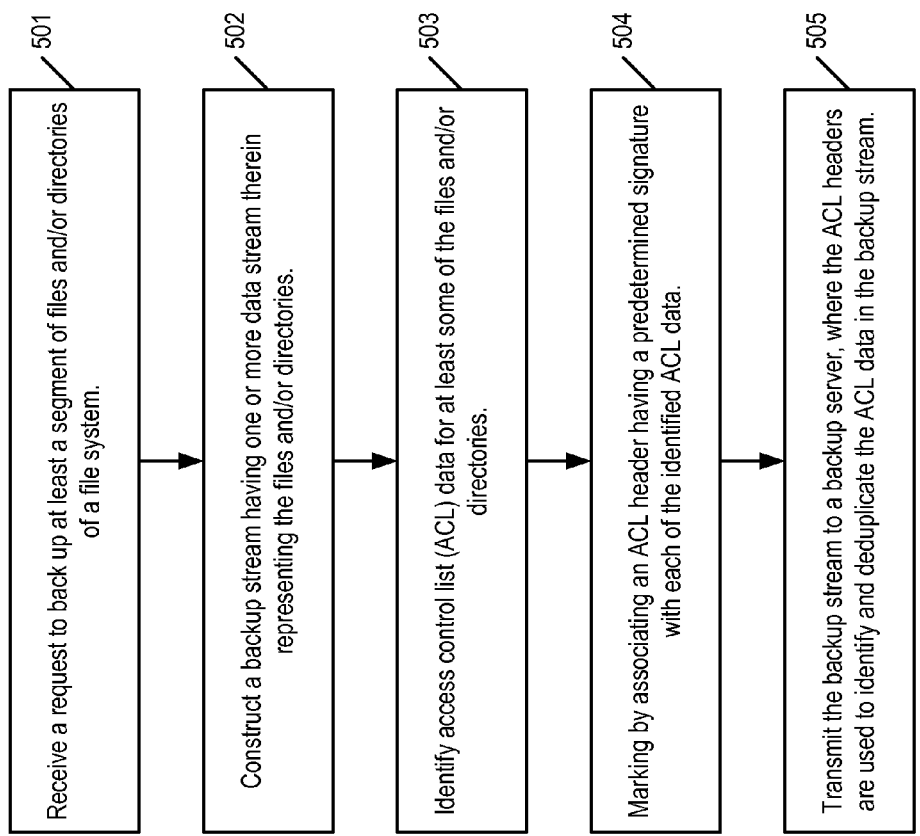
FIG. 5 is a flow diagram illustrating a method for processing ACL markers in a backup stream according to another embodiment of the invention.

FIG. 5 is a flow diagram illustrating a method for processing ACL markers in a backup stream according to another embodiment of the invention. Method 500 may be performed by processing logic that may include software, hardware, or a combination thereof. For example, method 500 may be performed by ACL marking unit 114 of FIG. 1. Referring to FIG. 5, at block 501, a request is received to back up at least a segment of files and/or a directory of a file system. In response to the request, at block 502, a backup stream is constructed, where the backup stream includes one or more data streams representing files or a directory of files. At block 503, one or more ACL data blocks are identified for at least some of the files and/or directories. At block 504, marking by associating or inserting an ACL marker (e.g., ACL header) having a predetermined signature with each of the ACL data blocks. According to one embodiment, an ACL marker is inserted in front of an ACL information block including a length field to specify a length of the associated ACL data block. At block 505, the backup stream is transmitted to a backup server, where the ACL markers are used to identify and deduplicate the ACL data blocks for storage.

Figure 6:
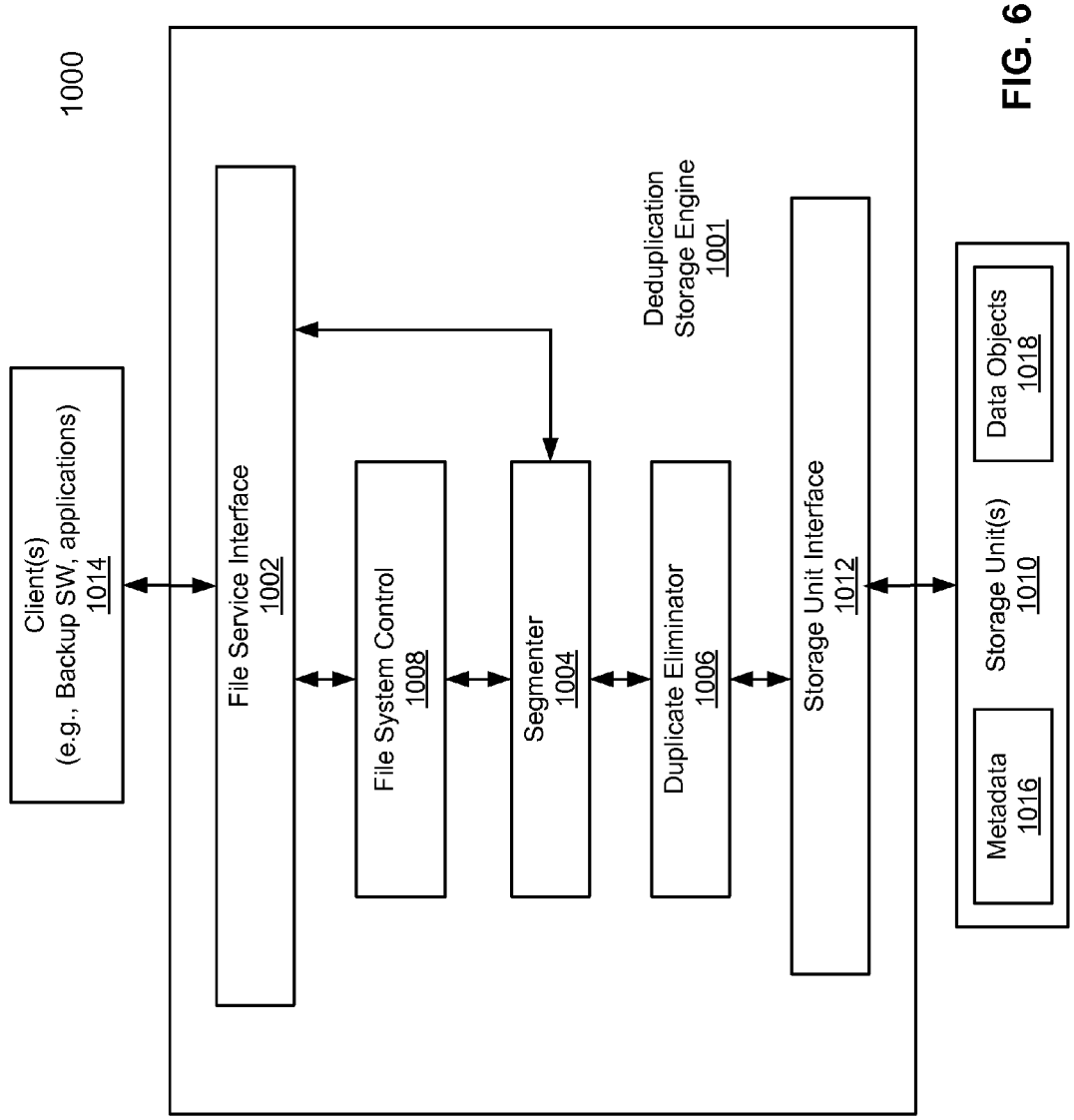
FIG. 6 is a block diagram illustrating a deduplicated storage system according to one embodiment of the invention.

FIG. 6 is a block diagram illustrating a deduplication storage system according to one embodiment of the invention. For example, deduplication storage system 1000 may be implemented as part of a deduplication storage system as described above, such as storage system 104 of FIG. 1. In one embodiment, storage system 1000 may represent a file server (e.g., an appliance used to provide network attached storage (NAS) capability), a block-based storage server (e.g., used to provide SAN capability), a unified storage device (e.g., one which combines NAS and SAN capabilities), a nearline storage device, a direct attached storage (DAS) device, a tape backup device, or essentially any other type of data storage device. Storage system 1000 may have a distributed architecture, or all of its components may be integrated into a single unit. Storage system 1000 may be implemented as part of an archive and/or backup system such as a deduplicating storage system available from EMC® Corporation of Hopkinton, Mass.

In one embodiment, storage system 1000 includes a deduplication engine 1001 interfacing one or more clients 1014 with one or more storage units 1010 storing metadata 1016 and data objects 1018. Clients 1014 may be any kinds of clients such as a client application or backup software located locally or remotely over a network. A network may be any type of networks such as a local area network (LAN), a wide area network (WAN) such as the Internet, a corporate intranet, a metropolitan area network (MAN), a storage area network (SAN), a bus, or a combination thereof, wired and/or wireless.

Storage units 1010 may be implemented locally (e.g., single node operating environment) or remotely (e.g., multi-node operating environment) via an interconnect, which may be a bus and/or a network. In one embodiment, one of storage units 1010 operates as an active storage to receive and store external or fresh user data, while the another one of storage units 1010 operates as a target storage unit to periodically archive data from the active storage unit according to an archiving policy or scheme. Storage units 1010 may be, for example, conventional magnetic disks, optical disks such as CD-ROM or DVD based storage, magnetic tape storage, magneto-optical (MO) storage media, solid state disks, flash memory based devices, or any other type of non-volatile storage devices suitable for storing large volumes of data. Storage units 108-109 may also be combinations of such devices. In the case of disk storage media, the storage units 1010 may be organized into one or more volumes of Redundant Array of Inexpensive Disks (RAID). Data stored in the storage units may be stored in a compressed form (e.g., lossless compression: Huffman coding, Lempel-Ziv Welch coding; delta encoding: a reference to a chunk plus a difference; etc.). In one embodiment, different storage units may use different compression methods (e.g., main or active storage unit from other storage units, one storage unit from another storage unit, etc.).

The metadata, such as metadata 1016, may be stored in at least some of storage units 1010, such that files can be accessed independent of another storage unit. Metadata of each storage unit includes enough information to provide access to the files it contains. In one embodiment, metadata may include fingerprints contained within data objects 1018, where a data object may represent a data chunk, a CR of data chunks, or a container of one or more CRs. Fingerprints are mapped to a particular data object via metadata 1016, enabling the system to identify the location of the data object containing a chunk represented by a particular fingerprint. When an active storage unit fails, metadata contained in another storage unit may be utilized to recover the active storage unit. When one storage unit is unavailable (e.g., the storage unit has failed, or is being upgraded, etc.), the system remains up to provide access to any file not stored in the failed storage unit. When a file is deleted, the metadata associated with the files in the system is updated to reflect that the file has been deleted.

In one embodiment, the metadata information includes a file name, a storage unit where the chunks associated with the file name are stored, reconstruction information for the file using the chunks, and any other appropriate metadata information. In one embodiment, a copy of the metadata is stored on a storage unit for files stored on a storage unit so that files that are stored on the storage unit can be accessed using only the information stored on the storage unit. In one embodiment, a main set of metadata information can be reconstructed by using information of other storage units associated with the storage system in the event that the main metadata is lost, corrupted, damaged, etc. Metadata for a storage unit can be reconstructed using metadata information stored on a main storage unit or other storage unit (e.g., replica storage unit). Metadata information further includes index information (e.g., location information for chunks in storage units, identifying specific data objects).

In one embodiment, deduplication storage engine 1001 includes file service interface 1002, segmenter 1004, duplicate eliminator 1006, file system control 1008, and storage unit interface 1012. Deduplication storage engine 1001 receives a file or files (or data item(s)) via file service interface 1002, which may be part of a file system namespace of a file system associated with the deduplication storage engine 1001. The file system namespace refers to the way files are identified and organized in the system. An example is to organize the files hierarchically into directories or folders. File service interface 1012 supports a variety of protocols, including a network file system (NFS), a common Internet file system (CIFS), and a virtual tape library interface (VTL), etc.

The file(s) is/are processed by segmenter 1004 and file system control 1008. Segmenter 1004 breaks the file(s) into variable-length chunks based on a variety of rules or considerations. For example, the file(s) may be broken into chunks by identifying chunk boundaries using a content-based technique (e.g., a function is calculated at various locations of a file, when the function is equal to a value or when the value is a minimum, a maximum, or other value relative to other function values calculated for the file), a non-content-based technique (e.g., based on size of the chunk), or any other appropriate technique. In one embodiment, a chunk is restricted to a minimum and/or maximum length, to a minimum or maximum number of chunks per file, or any other appropriate limitation.

In one embodiment, file system control 1008 processes information to indicate the chunk(s) association with a file. In some embodiments, a list of fingerprints is used to indicate chunk(s) associated with a file. File system control 1008 passes chunk association information (e.g., representative data such as a fingerprint) to an index (not shown). The index is used to locate stored chunks in storage units 1010 via storage unit interface 1012. Duplicate eliminator 1006 identifies whether a newly received chunk has already been stored in storage units 1010. In the event that a chunk has already been stored in storage unit(s), a reference to the previously stored chunk is stored, for example, in a chunk tree associated with the file, instead of storing the newly received chunk. A chunk tree of a file may include one or more nodes and each node represents or references one of the deduplicated chunks stored in storage units 1010 that make up the file. Chunks are then packed by a container manager (not shown) into one or more storage containers stored in storage units 1010. The deduplicated chunks may be further compressed using a variation of compression algorithms, such as a Lempel-Ziv algorithm before being stored.

When a file is to be retrieved, file service interface 1002 is configured to communicate with file system control 1008 to identify appropriate chunks stored in storage units 1010 via storage unit interface 1012. Storage unit interface 1012 may be implemented as part of a container manager. File system control 1008 communicates with an index (not shown) to locate appropriate chunks stored in storage units via storage unit interface 1012. Appropriate chunks are retrieved from the associated containers via the container manager and are used to construct the requested file. The file is provided via interface 1002 in response to the request. In one embodiment, file system control 1008 utilizes a tree (e.g., a chunk tree) of content-based identifiers (e.g., fingerprints) to associate a file with data chunks and their locations in storage unit(s). In the event that a chunk associated with a given file or file changes, the content-based identifiers will change and the changes will ripple from the bottom to the top of the tree associated with the file efficiently since the appropriate content-based identifiers are easily identified using the tree structure. Note that some or all of the components as shown as part of deduplication engine 1001 may be implemented in software, hardware, or a combination thereof. For example, deduplication engine 1001 may be implemented in a form of executable instructions that can be stored in a machine-readable storage medium, where the instructions can be executed in a memory by a processor.

In one embodiment, storage system 1000 may be used as a tier of storage in a storage hierarchy that comprises other tiers of storage. One or more tiers of storage in this hierarchy may utilize different kinds of storage devices and/or may be optimized for different characteristics such as random update performance. Files are periodically moved among the tiers based on data management policies to achieve a cost-effective match to the current storage requirements of the files. For example, a file may initially be stored in a tier of storage that offers high performance for reads and writes. As the file ages, it may be moved into a tier of storage according to one embodiment of the invention. In various embodiments, tiers include different storage technologies (e.g., tape, hard drives, semiconductor-based memories, optical drives, etc.), different locations (e.g., local computer storage, local network storage, remote network storage, distributed storage, cloud storage, archive storage, vault storage, etc.), or any other appropriate storage for a tiered data storage system.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method, comprising:
receiving a backup stream from a client, the backup stream having a plurality of data streams to be stored in a backup storage system, each data stream representing a file or a directory of one or more files of a file system associated with the client, wherein each data stream is associated with an access control list (ACL) block representing an access attribute for accessing a corresponding file or a directory of files of the corresponding data stream, wherein each ACL block includes an ACL marker and its associated ACL data, wherein each ACL marker includes a predetermined signature pattern immediately followed by a type of a marker as one of a plurality of types representing a plurality of different markers, wherein the type of a marker is immediately followed by a length indicating a size of the associated ACL data, wherein the length is immediately followed by the associated ACL data, the associated ACL data having a size specified by the length;
for each of the data streams,
scanning the backup stream to recognize an ACL marker associated with the data stream, the ACL marker identifying ACL data representing an ACL of the data stream, including recognizing the predetermined signature pattern and the type of the ACL marker associated with the data stream which are extracted from a corresponding ACL block,
extracting ACL data from the corresponding ACL block after recognizing the predetermined signature pattern and the type of the ACL marker, and
chunking using a predetermined chunking algorithm the ACL data into a plurality of ACL data chunks;
deduplicating the ACL data chunks into a plurality of deduplicated ACL data chunks by removing duplicated ones of the ACL data chunks, wherein deduplicating the ACL data chunks comprises:
for each of the ACL data chunks, generating a fingerprint by hashing content of the ACL data chunks using a predetermined hash function,
performing a lookup operation in an index based on the fingerprint to determine whether the index contains an entry matching the fingerprint, wherein the index includes a plurality of entries, each corresponding to a unique fingerprint and a storage location storing a deduplicated ACL data chunk corresponding to the unique fingerprint, which has been previously stored in the storage system, and
in response to determining that the index contains an entry matching the fingerprint, generating a reference to a storage location stored in the matching entry indicating that the ACL data chunk is a duplicated ACL data chunk; and
storing the deduplicated ACL data chunks in the storage system, including storing only references to storage locations of duplicated ACL data chunks that have been previously stored in the storage system without storing the duplicated ACL data chunks again, to reduce storage space required to store the ACL data, such that a storage space required to store the ACL data is reduced.

2. The method of claim 1, wherein each ACL block is immediately followed by its associated data stream within the backup stream, wherein each data stream includes a primary data stream and an alternate data stream, and wherein the primary data stream stores content of a file object and the alternate data stream stores metadata of the file object.

3. The method of claim 1, further comprising examining each ACL data chunk to determine whether the ACL data chunk satisfies a predetermined condition, wherein an ACL data chunk is chunked for deduplication only if the ACL data chunk satisfies the predetermined condition.

4. The method of claim 3, wherein examining each ACL data chunk comprises determining that a size of the ACL data chunk exceeds a predetermined threshold.

5. The method of claim 2, wherein each ACL marker is recognized by matching the predetermined signature pattern and the type of the ACL marker.

6. The method of claim 5, wherein the predetermined signature pattern includes a predetermined prime number.

7. The method of claim 6, wherein the predetermined signature pattern is determined based on a mathematical square of the predetermined prime number.

8. A non-transitory computer-readable medium having instructions stored therein, which when executed by a processor, cause the processor to perform operations, the operations comprising:
receiving a backup stream from a client, the backup stream having a plurality of data streams to be stored in a backup storage system, each data stream representing a file or a directory of one or more files of a file system associated with the client, wherein each data stream is associated with n an access control list (ACL) block representing an access attribute for accessing a corresponding file or a directory of files of the corresponding data stream, wherein each ACL block includes an ACL marker and its associated ACL data, wherein each ACL marker includes a predetermined signature pattern immediately followed by a type of a marker as one of a plurality of types representing a plurality of different markers, wherein the type of a marker is immediately followed by a length indicating a size of the associated ACL data, wherein the length is immediately followed by the associated ACL data, the associated ACL data having a size specified by the length;

for each of the data streams, including recognizing the predetermined signature pattern and the type of the ACL marker associated with the data stream which are extracted from a corresponding ACL block,
extracting ACL data from the corresponding ACL block after recognizing the predetermined signature pattern and the type of the ACL marker, and
chunking using a predetermined chunking algorithm the ACL data into a plurality of ACL data chunks;
deduplicating the ACL data chunks into a plurality of deduplicated ACL data chunks by removing duplicated ones of the ACL data chunks, wherein deduplicating the ACL data chunks comprises:
for each of the ACL data chunks, generating a fingerprint by hashing content of the ACL data chunks using a predetermined hash function,
performing a lookup operation in an index based on the fingerprint to determine whether the index contains an entry matching the fingerprint, wherein the index includes a plurality of entries, each corresponding to a unique fingerprint and a storage location storing a deduplicated ACL data chunk corresponding to the unique fingerprint, which has been previously stored in the storage system, and
in response to determining that the index contains an entry matching the fingerprint, generating a reference to a storage location stored in the matching entry indicating that the ACL data chunk is a duplicated ACL data chunk; and
storing the deduplicated ACL data chunks in the storage system, including storing only references to storage locations of duplicated ACL data chunks that have been previously stored in the storage system without storing the duplicated ACL data chunks again, to reduce storage space required to store the ACL data, such that a storage space required to store the ACL data is reduced.

9. The non-transitory computer-readable medium of claim 8, wherein each ACL block is immediately followed by its associated data stream within the backup stream, wherein each data stream includes a primary data stream and an alternate data stream, and wherein the primary data stream stores content of a file object and the alternate data stream stores metadata of the file object.

10. The non-transitory computer-readable medium of claim 8, wherein the method further comprises examining each ACL data chunk to determine whether the ACL data chunk satisfies a predetermined condition, wherein an ACL data chunk is chunked for deduplication only if the ACL data chunk satisfies the predetermined condition.

11. The non-transitory computer-readable medium of claim 10, wherein examining each ACL data chunk comprises determining that a size of the ACL data chunk exceeds a predetermined threshold.

12. The non-transitory computer-readable medium of claim 9, wherein each ACL marker is recognized by matching the predetermined signature pattern and the type of the ACL marker.

13. The non-transitory computer-readable medium of claim 12, wherein the predetermined signature pattern includes a predetermined prime number.

14. The non-transitory computer-readable medium of claim 13, wherein the predetermined signature pattern is determined based on a mathematical square of the predetermined prime number.

15. A storage system, comprising:
a processor;
one or more storage units; and
a backup engine executed by the processor to
receive a backup stream from a client, the backup stream having a plurality of data streams, each data stream representing a file or a directory of one or more files of a file system associated with the client, wherein each data stream is associated with an access control list (ACL) block representing an access attribute for accessing a corresponding file or a directory of files of the corresponding data stream, wherein each ACL block includes an ACL marker and its associated ACL data, wherein each ACL marker includes a predetermined signature pattern immediately followed by a type of a marker as one of a plurality of types representing a plurality of different markers, wherein the type of a marker is immediately followed by a length indicating a size of the associated ACL data, wherein the length is immediately followed by the associated ACL data, the associated ACL data having a size specified by the length,
for each of the data streams,
scan the backup stream to recognize an ACL marker associated with the data stream, the ACL marker identifying ACL data representing an ACL of the data stream, including recognizing the predetermined signature pattern and the type of the ACL marker associated with the data stream which are extracted from a corresponding ACL block,
extracting ACL data from the corresponding ACL block after recognizing the predetermined signature pattern and the type of the ACL marker, and
chunk using a predetermined chunking algorithm the ACL data into a plurality of ACL data chunks,
deduplicate the ACL data chunks into a plurality of deduplicated ACL data chunks by removing duplicated ones of the ACL data chunks, wherein deduplicating the ACL data chunks comprises:
for each of the ACL data chunks, generating a fingerprint by hashing content of the ACL data chunks using a predetermined hash function,
performing a lookup operating in an index based on the fingerprint to determine whether the index contains an entry matching the fingerprint, wherein the index includes a plurality of entries, each corresponding to a unique fingerprint and a storage location storing a deduplicated ACL data chunk corresponding to the unique fingerprint, which has been previously stored in the storage system, and
in response to determining that the index contains an entry matching the fingerprint, generating a reference to a storage location stored in the matching entry indicating that the ACL data chunk is a duplicated ACL data chunk, and
store the deduplicated ACL data chunks in the storage system, including storing only references to storage locations of duplicated ACL data chunks that have been previously stored in the storage system without storing the duplicated ACL data chunks again, to reduce storage space required to store the ACL data, such that a storage space required to store the ACL data is reduced.

16. The system of claim 15, wherein each ACL block is immediately followed by its associated data stream within the backup stream, wherein each data stream includes a primary data stream and an alternate data stream, and wherein the primary data stream stores content of a file object and the alternate data stream stores metadata of the file object.

17. The system of claim 15, wherein the deduplication engine is to examine each ACL data chunk to determine whether the ACL data chunk satisfies a predetermined condition, wherein an ACL data chunk is chunked for deduplication only if the ACL data chunk satisfies the predetermined condition.

18. The system of claim 17, wherein examining each ACL data chunk comprises determining that a size of the ACL data chunk exceeds a predetermined threshold.

19. The system of claim 16, wherein each ACL marker is recognized by matching the predetermined signature pattern and the type of the ACL marker.

20. The system of claim 19, wherein the predetermined signature pattern includes a predetermined prime number.

21. The system of claim 20, wherein the predetermined signature pattern is determined based on a mathematical square of the predetermined prime number.

\* \* \* \* \*